(12) United States Patent
Tazoe et al.

(10) Patent No.: US 7,967,594 B2
(45) Date of Patent: Jun. 28, 2011

(54) FACILITY FOR FORMING CELL ELECTRODE PLATE

(75) Inventors: Nobuhiro Tazoe, Tokyo (JP); Hisashi Honjou, Tokyo (JP); Akihiro Nomura, Tokyo (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 410 days.

(21) Appl. No.: 11/813,108

(22) PCT Filed: Jan. 25, 2005

(86) PCT No.: PCT/JP2005/000896
§ 371 (c)(1),
(2), (4) Date: Oct. 12, 2007

(87) PCT Pub. No.: WO2006/080045
PCT Pub. Date: Aug. 3, 2006

(65) Prior Publication Data
US 2008/0098590 A1   May 1, 2008

(51) Int. Cl.
*B21B 31/02* (2006.01)
(52) U.S. Cl. ............. 425/363; 425/366; 72/7.1; 72/10.4
(58) Field of Classification Search .................. 425/363, 425/366, 367, 141; 72/241.8, 8.6, 11.4, 11.8, 72/7.1, 10.4
See application file for complete search history.

(56) References Cited

U.S. PATENT DOCUMENTS

| | | | | |
|---|---|---|---|---|
| 2,732,591 | A * | 1/1956 | Whittum | 425/363 |
| 2,922,325 | A * | 1/1960 | Forster | 425/DIG. 235 |
| 3,714,805 | A * | 2/1973 | Stone | 72/10.4 |
| 4,651,547 | A * | 3/1987 | Morel et al. | 100/162 B |
| 5,142,891 | A * | 9/1992 | Kuwano | 72/11.4 |
| 5,448,901 | A * | 9/1995 | Yu et al. | 72/247 |
| 6,244,090 | B1 * | 6/2001 | Le Viavant | 72/241.8 |
| 7,513,136 | B2 * | 4/2009 | Laliberte et al. | 72/241.8 |
| 2007/0187231 | A1 | 8/2007 | Tazoe | |

FOREIGN PATENT DOCUMENTS

| | | |
|---|---|---|
| DE | 199 26 633 A1 | 1/2000 |
| EP | 1 174 935 A2 | 1/2002 |
| JP | 10 214617 | 8/1998 |
| JP | 11-3701 | 1/1999 |
| JP | 11-260356 | 9/1999 |
| JP | 2000-233298 | 8/2000 |

(Continued)

OTHER PUBLICATIONS

U.S. Appl. No. 10/585,650, filed Jul. 7, 2006, Tazoe.

*Primary Examiner* — Richard Crispino
*Assistant Examiner* — Thu Khanh T Nguyen
(74) *Attorney, Agent, or Firm* — Oblon, Spivak, McClelland, Maier & Neustadt, L.L.P.

(57) ABSTRACT

Even when a cell electrode plate with broader width is press formed to enhance bulk density of electrode active material, it is made possible to positively and reliably provide a high-quality cell electrode plate with good productivity. From upstream to downstream in a travel direction of a cell electrode plate including a core member with electrode active material applied thereon, an uncoiler, a tension applicator, a four-high mill type roll press device, a thickness detector, a tension applicator and a coiler are arranged in the order named.

2 Claims, 5 Drawing Sheets

FOREIGN PATENT DOCUMENTS

| | | |
|---|---|---|
| JP | 2001 332248 | 11/2001 |
| JP | 2001 357840 | 12/2001 |
| JP | 2002 184394 | 6/2002 |
| JP | 2003 323886 | 11/2003 |
| JP | 2004-154828 | 6/2004 |
| WO | 01 22506 | 3/2001 |
| WO | WO 2004/026498 A1 | 4/2004 |

* cited by examiner

FACILITY FOR FORMING CELL ELECTRODE PLATE

TECHNICAL FIELD

The present invention relates to a facility for forming a cell electrode plate.

BACKGROUND ART

In a cell electrode such as a lithium-cell positive pole member, conventionally, electrode mixture or electrode active material such as $LiCoO_2$ is applied and dried on a core member or collector made of metal foil such as aluminum foil and then is press formed to enhance bulk density of the electrode active material. Such prior art is disclosed, for example, in Reference 1. In Reference 1, a cell electrode plate with electrode active material applied and dried on a core member is press formed by a two-high mill type roll press device with a pair of upper and lower press rolls.

[Reference 1] JP 11-003701A

SUMMARY OF THE INVENTION

Problems To Be Solved By The Invention

Conventionally, a cell electrode plated press formed by a two-high mill type roll press device is narrower in width. In recent years, it has been proposed to make a cell electrode plate broader in width for improvement of productivity and the like. However, when a cell electrode plate with broader width is to be press formed, press rolls longer in length are required so that, even if load per unit area upon press forming is not changed, its forming load ($\propto$ load per unit area upon forming press×length of press roll) is higher than that in press forming a cell electrode plate with narrower width. Thus, when a cell electrode plate with broader width is press formed by press rolls with a diameter same as that of press rolls of a roll press device for press forming a conventional cell electrode plate with narrower width, a great deflection is caused on the press rolls due to press reaction force. In order to prevent such deflection, the press rolls must have increased diameter.

For comparison, a conventional roll press device for pressing a cell electrode plate with a predetermined narrow width has press rolls with a diameter of about 700 mm or so whereas a press roll diameter of 1200 mm or so is required for press of a cell electrode plate with broader width.

Thus, as mentioned in the above, to make press rolls larger in diameter so as to respond to a cell electrode plate with broader width would result in increase in size of the whole apparatus and therefore is actually difficult to carry out. Even if a press roll is daringly increased in diameter, a forming load required also become high as mentioned above so that the apparatus must be further increased in size and, due to bending and/or planarization of the rolls, high rolling reduction becomes difficult; a cell electrode plate may be torn and roll replacement operation may become difficult, resulting in deterioration in productivity and in quality of products.

The invention has its object to overcome the above problems in press forming a cell electrode plate with so-called broad width so as to enhance bulk density of electrode active material on the plate and make it possible to reliably and stably provide a high-quality cell electrode plate with high productivity.

Means or Measures for Solving the Problems

The invention is directed to a facility for forming a cell electrode plate comprising an uncoiler, a four-high mill type roll press device and a coiler in the order named from upstream to downstream in a travel direction of the cell electrode plate with electrode active material applied on a core member. In the facility for forming the cell electrode plate according to the invention, tension applicators may be arranged between the uncoiler and roll press device and between the roll press device and coiler, respectively; a thickness detector may be arranged between the roll press device and tension applicator downstream of said roll press device in the travel direction of the cell electrode plate.

Further in the facility for forming the cell electrode plate according to the invention, it is preferable that the roll press device have the press rolls with a diameter smaller than that of press rolls in a two-high mill type roll press device, that the roll press device has the paired upper and lower press rolls with benders for applying increase bending thereto and that increase bending applied by the benders is decreased when positive pole active material on the cell electrode plate become disengaged from the paired upper and lower press rolls.

Effects of the Invention

A facility for forming a cell electrode plate according to the invention can have the following various excellent effects and advantages.

I) Even with a cell electrode plate broader in width, press rolls of a roll press device may be made smaller in diameter and thus a forming load upon press forming may be low.

II) Since the forming load upon press forming may be low, the roll press device is not increased in size and bending and planarization of the press rolls can be prevented from occurring, whereby high rolling reduction can be realized. Since lower tension is applied to the cell electrode plate by a tension applicator, a core member becomes difficult to be torn; since the press rolls are smaller in diameter and are easily replaceable, a high-quality cell electrode plate can be obtained with enhanced productivity by press forming.

III) When benders are provided for the roll press device, bending of the press rolls due to forming load can be counteracted; even if the cell electrode plate is broader in width, electrode active material can be formed as rectangle on a cell electrode plate by press forming. Use in combination with benders can prevent ill shape such as edge corrugation from being produced on the press-formed cell electrode plate, so that the press-formed cell electrode plate can have further enhanced quality.

IV) Since the core member of the cell electrode plate is prevented from being torn, stable press forming can be carried out.

V) Since the roll press device is of four-high mill type and press rolls can be made smaller in diameter, press forming in high rolling reduction can be carried out, so that bulk density of electrode active material on the cell electrode plate can be further enhanced and thus cell performance can be improved.

Figure 1:
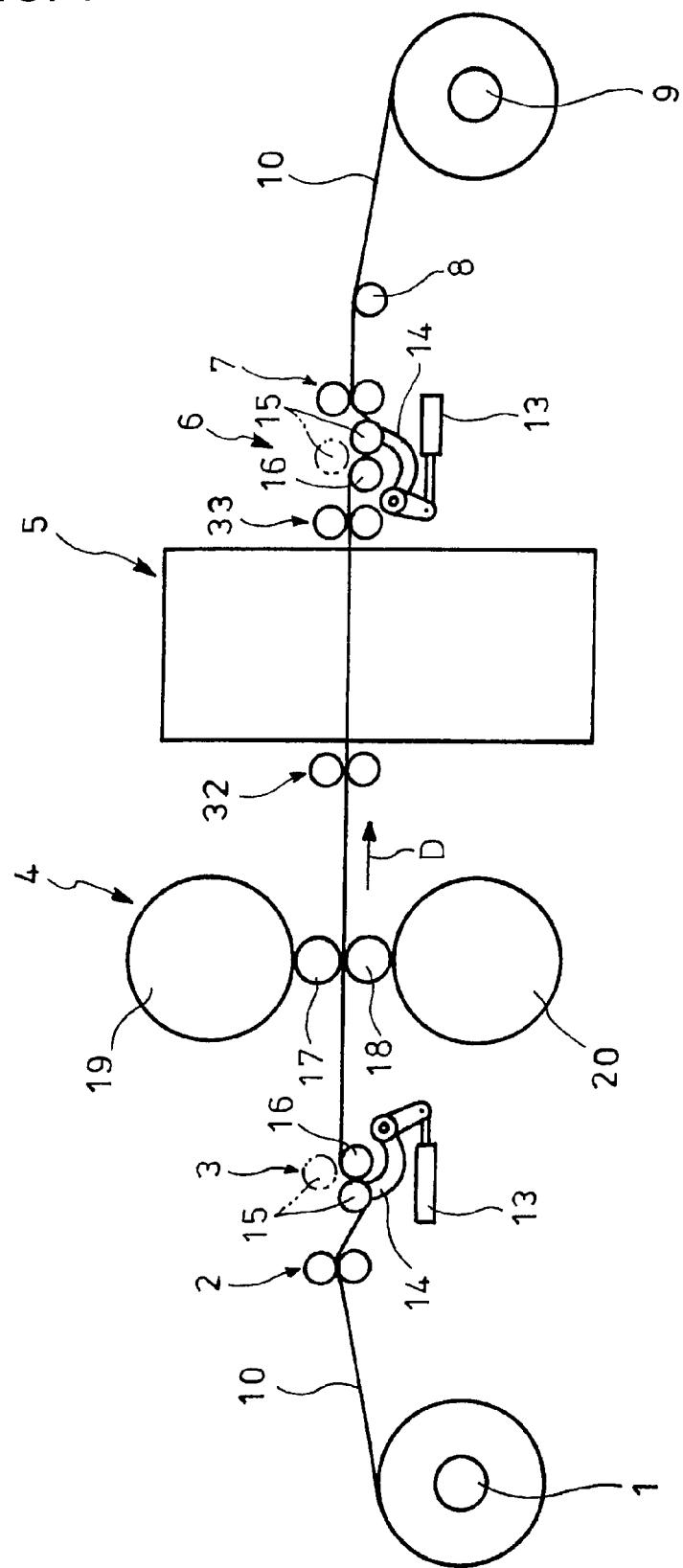
[FIG. 1] A schematic side view showing an embodiment of a facility for forming a cell electrode plate according to the invention.

EXPLANATION OF THE REFERENCE NUMERALS 1 uncoiler
3 tension applicator
4 roll press device
5 thickness detector
6 tension applicator
9 coiler
10 cell electrode plate
11 core member
12 positive pole active material (electrode active material)
17,18 press roll
23 bender

BEST MODE FOR CARRYING OUT THE INVENTION

An embodiment of the invention will be described in junction with drawings.

FIGS. 1-10 show the embodiment of the invention in which reference numeral 1 denotes an uncoiler; 2, pinch rolls; 3, a tension applicator; 4, a roll press device; 5, a thickness detector; 6, a tension applicator; 7, pinch rolls; 8, a deflector roll; 9, a coiler. The uncoiler 1, pinch rolls 2, tension applicator 3, roll press device 4, thickness detector 5, tension applicator 6, pinch rolls 7, deflector roll 8, coiler 9 are arranged in the order named from upstream to downstream in a travel direction D of a cell electrode plate 10.

Figure 3:
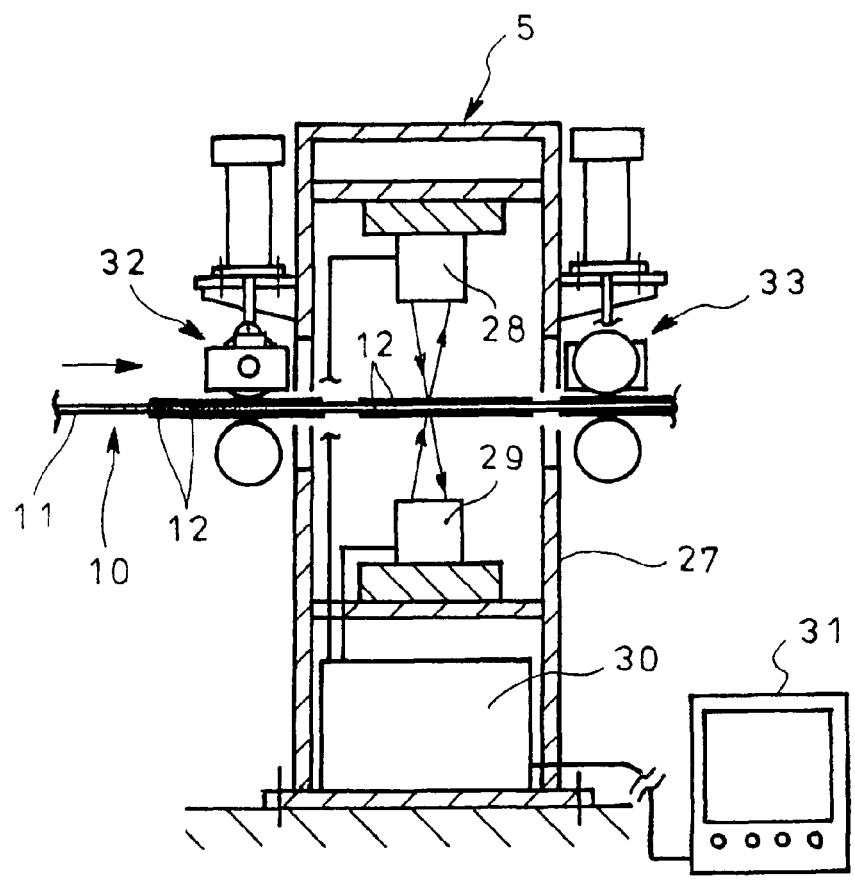
[FIG. 3] A detailed side view showing a thickness detector applied to the facility for forming a cell electrode plate of FIG. 1.
Figure 4:
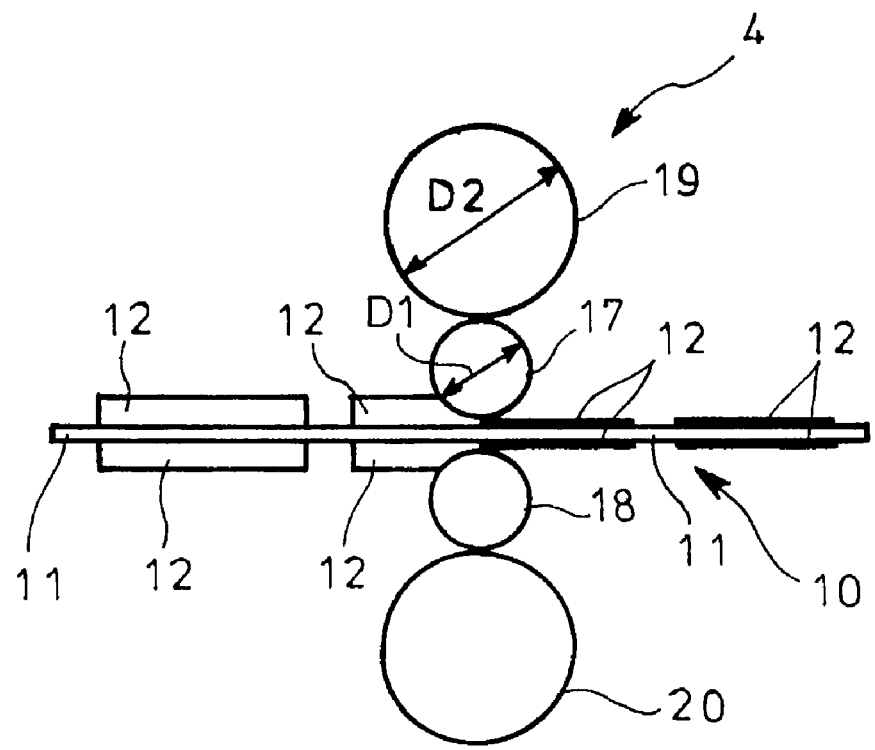
[FIG. 4] A side view showing a cell electrode plate before and after it is press formed by a roll press device in the facility for forming the cell electrode plate shown in FIG. 1.

The cell electrode plate 10 comprises, as shown in FIGS. 3 and 4, a band-like core member or aluminum foil collector 11 with upper and lower surfaces of which discontinuously applied is electrode mixture or positive pole active material ($LiCoO_2$) 12 in a longitudinally spaced apart relationship. Alternatively, the positive pole active material 12 may be applied either of the upper and lower surfaces.

Each of the tension applicators 3 and 6 is a looper type device for application of low tension to the cell electrode plate 10 fed in line to such an extent that the cell electrode plate 10 is not torn. It comprises an arm 14 vertically pivotable in a vertical plane by a hydraulic cylinder 13, a roll 15 rotatably supported by the arm 14 and a roll 16 rotatably supported in a stationary position; by positioning the roll 15 in a solid line position in FIG. 1, low tension may be applied to the cell electrode plate 10. Tension to the cell electrode plate 10 may be controlled by controlling position of the rolls 15 of the tension applicators 3 and 6.

Thus, when low tension is applied to the cell electrode plate 10, the roll 16 of the tension applicator 3 is positioned downstream of the its roll 15 in the travel direction D of the cell electrode plate 10; the roll 16 of the tension applicator 6 is positioned upstream of its roll 15 in the travel direction D of the cell electrode plate 10. The tension applicators 3 and 6 are not limited to those shown in the embodiment; alternatively, dancer or pinch rolls may be used.

The roll press device 4 is of four-high mill type and comprises a pair of small-diameter upper and lower press rolls 17 and 18 and a pair of large-diameter upper and lower backup rolls 19 and 20 for backup of the press rolls 17 and 18. Diameter D1 of the press rolls 17 and 18 is about 300 mm and diameter D2 of the backup rolls 19 and 20 is about 700 mm; the press rolls 17 and 18 are smaller in diameter than those of the conventional two-high mill type roll press devices.

Figure 2:
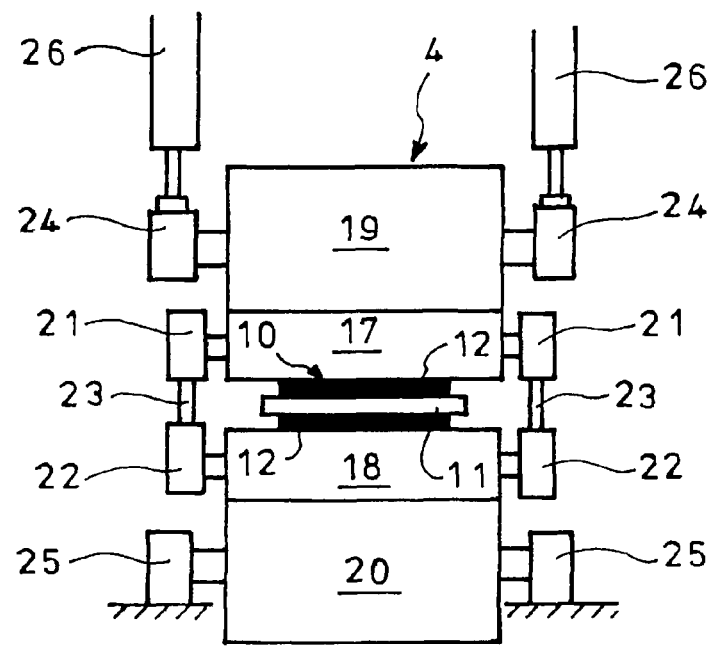
[FIG. 2] A detailed front view of a roll press device shown in FIG. 1.

As shown in FIG. 2, the press rolls 17 and 18 in the roll press device 4 are respectively provided, at their opposite ends, with journal boxes 21 and 22 through which hydraulic piston type benders 23 are arranged so as to apply increase bending to the press rolls 17 and 18. In FIG. 2, reference numerals 24 and 25 denote journal boxes arranged on opposite axial ends of the backup rolls 19 and 20, respectively; and 26, press cylinders for press forming the cell electrode plate 10 through pressing of the journal boxes 24.

As shown in FIG. 3, the thickness detector 5 comprises a frame body 27, a sensor body 28 arranged on a upper portion of the frame body 27 so as to be positioned above the cell electrode plate 10 fed in line, a sensor body 29 arranged on a lower portion of the frame body 27 so as to be positioned below the plate 10, a controller 30 for receiving signals from the sensor bodies 28 and 29 and a monitor 31 for monitoring thickness of the plate 10 on the basis of a signal from the controller 30. The monitor 31 is arranged in a control chamber. The thickness detector 5 has pinch rolls 32 and 33 at entry and exit sides of the cell electrode plate 10, respectively.

Though only the single pair of sensor bodies 28 and 29 are shown in FIG. 3, in fact a plurality of pairs of sensor bodies are arranged in a spaced apart relationship along the width of the cell electrode plate 10. The sensor bodies 28 and 29 may be of the type using X-ray, gamma ray or the like, or of the optical type using for example CCD.

Next, mode of operation of the above embodiment will be described. It is to be noted in this connection that upon feeding the cell electrode plate 10 in line, the uncoiler 1, pinch rolls 2, rolls 15 and 16 of the tension applicator 3, press rolls 17 and 18 of the roll press device 4, backup rolls 19 and 20, pinch rolls 32 and 33 of the thickness detector 5, rolls 16 and 15 of the tension applicator 6, pinch rolls 7, deflector roll 8 and coiler 9 are rotated in accord with feed velocity of the cell electrode plate 10 in a travel direction D thereof.

The cell electrode plate 10 unwound from the uncoiler 1 is fed via the pinch roll 2 to the tension applicator 3 where it is wrapped around the rolls 15 and 16 at appropriate angles so that a certain low tension is applied thereto. Then, the plate is fed to the roll press device 4 and is passed through the press rolls 17 and 18 of the device 4 so that the plate is press formed by the action of the press cylinders 26 (see FIG. 2).

Thus, the positive pole active material 12 on the cell electrode plate 10 is compressed and densificated as shown in FIGS. 2 and 4 to thereby improve the bulk density. In the roll press device 4, increase bending is applied to the press rolls 17 and 18 by the benders 23 such that, as shown in FIG. 5, the press rolls 17 and 18 are bent at their opposite axial ends to increase their roll gaps G1; upon press forming, such roll gaps G1 are counteracted by the press force of the press cylinders

26 so that the press-formed positive pole active material 12 can have good, rectangular cross-sectional shape.

Figure 6:
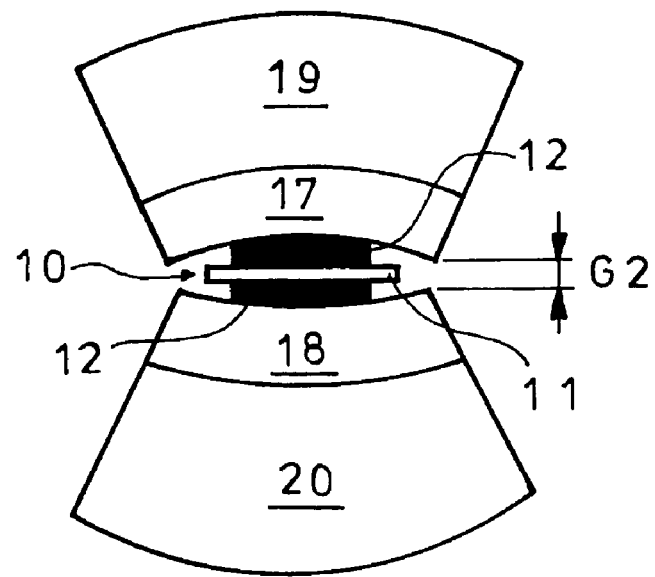
[FIG. 6] A front view showing bending shape of the press rolls when increase bending is not applied to the press rolls.
Figure 7:
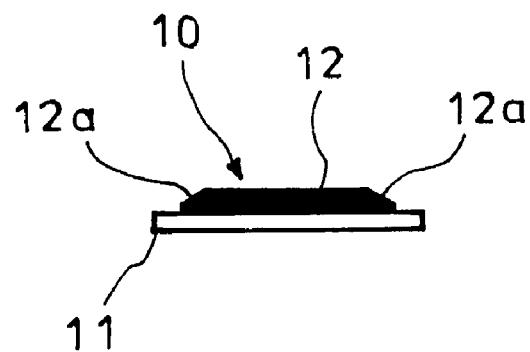
[FIG. 7] A sectional view showing shape of the cell electrode plate when press formed with no increase bending applied.

More specifically, when no increase bending is applied by the benders 23, actuation of the press cylinders 26 shown in FIG. 2 causes the press rolls 17 and 18 at their axially opposite ends to have, as shown in FIG. 6, gaps G2 each smaller than a gap between longitudinally intermediate portions of the press rolls 17 and 18; as a result, the positive pole active material 12 on the press formed cell electrode plate 10 has, as shown in FIG. 7, at its opposite widthwise edges, portions 12a declining widthwise and outwardly, disadvantageously resulting in ill shape.

Figure 5:
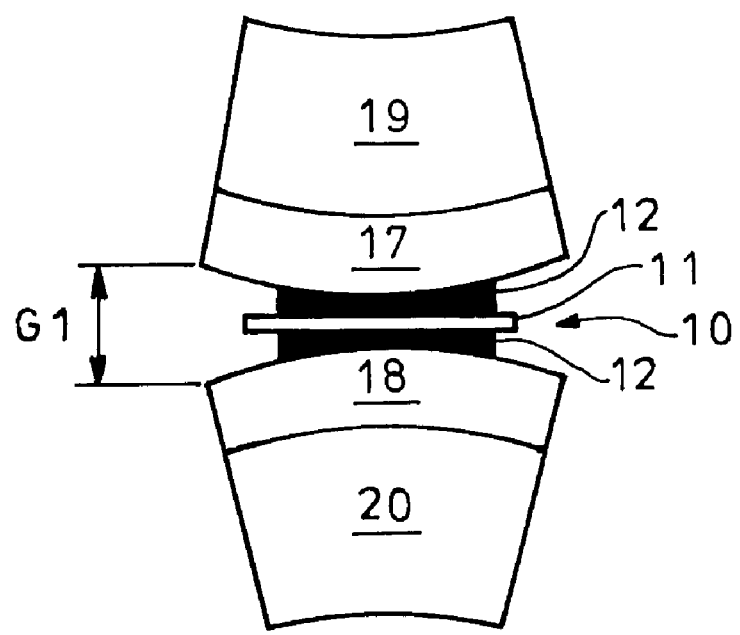
[FIG. 5] A front view showing bending shape of upper and lower press rolls when increase bending is applied to the press rolls by benders shown in FIG. 2.
Figure 8:
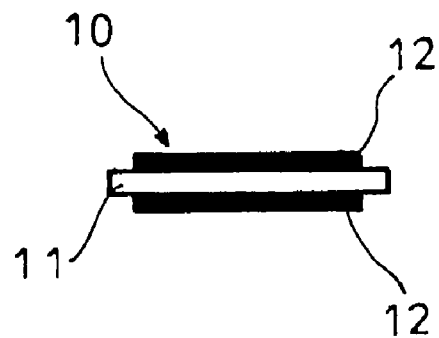
[FIG. 8] A sectional view showing shape of the cell electrode plate when press formed with increase bending applied.

By contrast, when increase bending is applied as shown in FIG. 5, gaps G1 at axially opposite ends of the press rolls 17 and 18 due to press forming by the press cylinders 26 are counteracted by the forming load by the press cylinder 26 so that the longitudinal shape of the press rolls 17 and 18 becomes substantially flat at its portions abutting on the positive pole active material 12, whereby the positive pole active material 12 on the press-formed cell electrode plate 10 becomes substantially flat as shown in FIG. 8, resulting in attainment of good shaped product.

As shown in FIG. 4, the cell electrode plate 10 has portions in a predetermined spaced-apart relationship on which no positive pole active material 12 is applied. Thus, when transition is caused from press forming of the positive pole active material 12 on the cell electrode plate 10 by the press rolls 17 and 18 with increase bending being applied thereto to coming of the core member 11 of the cell electrode plate 10 with no positive pole active material 12 applied thereon into between the upper and lower press rolls 17 and 18, then the longitudinal intermediate portions of the upper and lower press rolls 17 and 18 are bent closer to each other to have smaller gap therebetween so that the press roll 17 may fall to collide against and give impact to the core member 11 to tear the same.

To overcome such disadvantage, upon press forming with increase bending being applied, increase bending forces by the press cylinders 26 are decreased to decrease the roll gaps G1 between axially opposite ends of the upper and lower press rolls 17 and 18 shown in FIG. 5 when the positive pole active material 12 on the cell electrode plate 10 is out of engagement with the press rolls 17 and 18. As a result, the bending of the press rolls 17 and 18 at their longitudinally intermediate portions is decreased to increase the roll gap thereat; as a result, the press roll 17 does not fall so much and gives no impact to the core member 11, so that the core member 11 can be prevented from being torn during press forming of the cell electrode plate 10.

When, again, the upper and lower press rolls 17 and 18 receive therebetween forward ends of the positive pole active material 12 on the plate 10 in the travel direction of the plate, the increase bending forces are increased to return increase bending to its original.

The thickness detector 5 detects thickness of the cell electrode plate 10 having press formed in the roll press device 4. More specifically, for example, radiant rays from the sensor bodies 28 and 29 are reflected on surfaces of the cell electrode plate 10 to be returned to the sensor bodies 28 and 29. Thus, signals from the sensor bodies 28 and 29 are given to the controller 30 where they are treated and given to the monitor 31. Then, the monitor 31 displays, for example, longitudinal position and thickness of the cell electrode plate 10.

The cell electrode plate 10 with its thickness having been detected by the thickness detector 5 is delivered downstream and is applied with low tension by the tension applicator 6 and is wound through the deflector roll 8 by the coiler 9.

According to the embodiment, even if the cell electrode plate 10 is broader in width than the conventional ones, the press rolls 17 and 18 of the roll press device 4 may be small in diameter, whereby the forming load upon press forming may be low. In a predetermined amount of press forming conducted, forming load is affected by diameter of the press rolls 17 and 18. When the press rolls 17 and 18 are smaller in diameter, the forming load upon press forming may be low; when the press rolls 17 and 18 are larger in diameter, the forming load required upon press forming is high.

Figure 9:
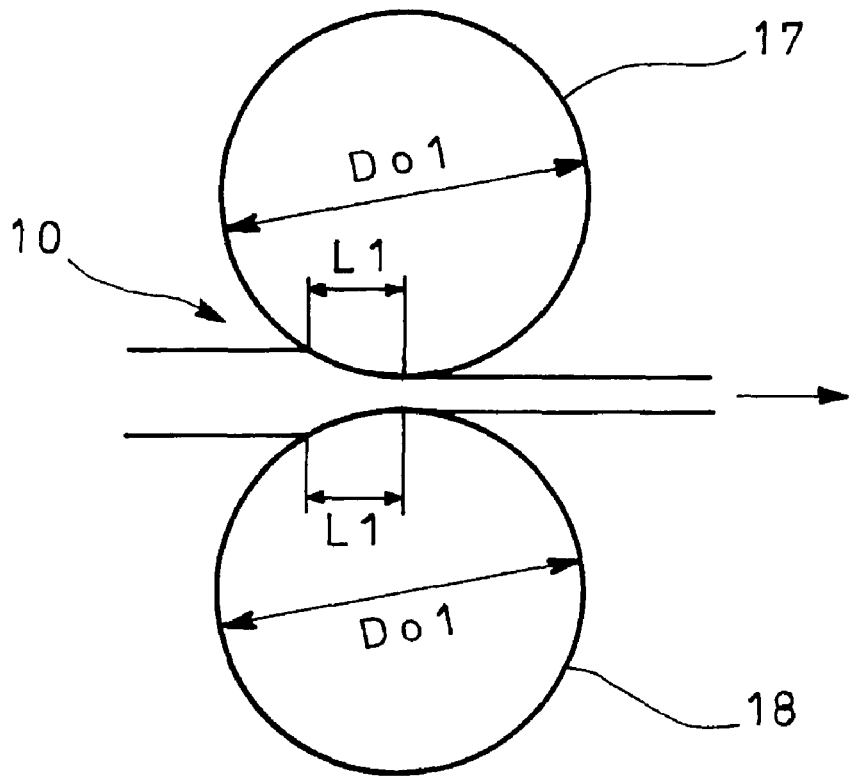
[FIG. 9] A side view of the press rolls for explanation of forming load increasing when the press rolls are large in diameter.
Figure 10:
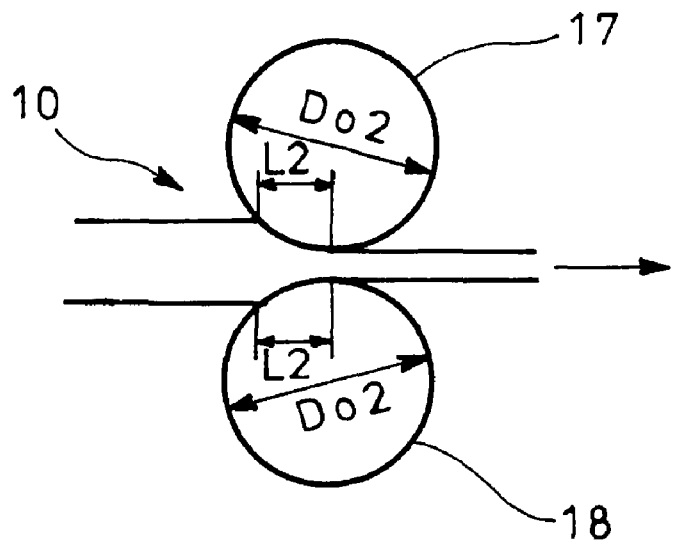
[FIG. 10] A side view of the press rolls for explanation of forming load decreasing when the press rolls are small in diameter.

More specifically, as shown in FIG. 9, when the press roll 17 has a large diameter Do1, contact projection arc length L1 of the press rolls 17 and 18 to the cell electrode plate 10 during press forming is longer than contact projection arc length L2 of the press rolls 17 and 18 as shown in FIG. 10 when the press rolls 17 and 18 have a small diameter Do2 (L1>L2). In this regard, it is presupposed that the same press amount is applied both in FIGS. 9 and 10. Moreover, because "forming load upon press forming=deformation resistance of material×contact projection area of press rolls against material" and "contact projection area=contact projection arc length×longitudinal contact length of the press roll 17, 18 to the material", provided that longitudinal contact lengths of the press rolls 17 and 18 shown in FIGS. 9 and 10 are the same, the forming load required upon press forming becomes high in the press rolls 17 and 18 shown in FIG. 9 since contact projection arc length L1 is longer than contact projection arc length L2. Thus, in the press rolls 17 and 18 with small diameter, the forming load upon press forming may be low since the contact projection arc length L2 is shorter as mentioned above.

When the press rolls 17 and 18 are small in diameter, the forming load upon press forming may be low and the backup rolls 19 and 20 may be also made small in diameter.

In the embodiment, the press rolls 17 and 18 can be made small in diameter and the forming load upon press forming may be low so that the roll press device 4 does not become larger-sized, and the press rolls 17 and 18 can be prevented from being bent or planarized so that the roll press device 4 can attain high rolling reduction. Since the cell electrode plate 10 is applied with low tension by the tension applicators 3 and 6 and the increase bending force is decreased when the core member 11 is out of engagement between the press rolls 17 and 18, the core member 11 is difficult to be torn; since the press rolls 17 and 18 are small in diameter, increase bending by the benders 23 is easy to apply and roll replacement operation is easy to conduct, a high-quality cell electrode plate 10 can be obtained by press forming with improved productivity.

Since the roll press device 4 is provided with the benders 23 for application of increase bending, bending of the press rolls 17 and 18 due to the forming load of the press cylinders 26 can be counteracted and, even if the cell electrode plate 10 is broad in width, the press formed positive pole active material 12 on the cell electrode plate 10 can be rectangular. By adjusting the increase bending forces by the benders 23, widthwise ends of the positive pole active material 12 on the press formed cell electrode plate 10 can be prevented from causing shape illness such as edge corrugation, whereby the press formed cell electrode plate 10 can be improved in quality.

Since, as mentioned above, the core member 11 of the cell electrode plate 10 is not torn, stable press forming can be carried out.

Moreover, the roll press device 4 is of four-high mill type and the press rolls 17 and 18 can be made small in diameter, so that press forming with higher rolling reduction can be carried out, the positive pole active material 12 on the cell electrode plate 10 can be further enhanced in its bulk density and cell performance can be improved.

It is to be understood that a facility for forming a cell electrode plate of the invention is not limited to the above embodiment and that various changes and modifications may be made without departing from the scope of the invention. For example, the description has been made on application of the cell electrode plate to the cell positive electrode; however, it may be also applicable not to the cell positive electrode but to cell negative electrode. The invention may be applicable to any cell electrode plate with various width from broader width to narrower width.

Industrial Applicability

A facility for forming a cell electrode plate according to the invention can be utilized as the facility for forming the cell electrode plate to enhance bulk density of electrode active material.

The invention claimed is:

1. A facility for forming a cell electrode plate comprising:
   an uncoiler;
   a four-high mill type roll press device; and
   a coiler in the order named from upstream to downstream in a travel direction of the cell electrode plate with electrode active material discontinuously applied on a core member in a longitudinally spaced apart relationship,
   wherein said roll press device includes a pair of upper and lower press rolls, a pair of upper and lower backup rolls for backup of the press rolls and benders arranged between upper and lower journal boxes on opposite axial ends of the press rolls for rotatable support of said press rolls for applying increase bending to the paired upper and lower press rolls,
   wherein the upper backup roll of said paired upper and lower backup rolls are connected to press cylinders through the upper journal boxes,
   wherein said cell electrode plate is rollable through said press rolls by operating the press cylinders,
   wherein the increase bending applied by the benders is decreased so as to prevent the cell electrode plate from being torn when positive pole active material of the cell electrode plate becomes disengaged from the paired upper and lower press rolls,
   wherein a first tension applicator is arranged between the uncoiler and roll press device for applying lower tension to such an extent that said cell electrode plate is not torn and comprises an arm vertically pivotable in a vertical plane, a roll rotatably supported by the arm and a roll rotatably supported in a stationary position,
   wherein a second tension applicator is arranged between the roll press device and coiler for applying lower tension to such an extent that said cell electrode plate is not torn and comprises an arm vertically pivotable in a vertical plane, a roll rotatably supported by the arm and a roll rotatably supported in a stationary position, and
   wherein a thickness detector is arranged between the roll press device and the second tension applicator located downstream of the roll press device in the travel direction of the cell electrode plate and has sensor bodies between upstream and downstream pinch rolls located to pinch the cell electrode plate at entry and exit sides of the cell electrode plate respectively, signals from the sensor bodies being given to a monitor for displaying longitudinal position and thickness of the cell electrode plate.

2. A facility for forming a cell electrode plate as claimed in claim 1, further comprising press cylinders provided on journal boxes arranged on opposite axial ends of the upper backup roll.

* * * * *